(12) United States Patent
Clark et al.

(10) Patent No.: US 10,887,190 B2
(45) Date of Patent: Jan. 5, 2021

(54) SYSTEM FOR SIMULTANEOUS VIEWING AND EDITING OF MULTIPLE NETWORK DEVICE CONFIGURATIONS

(71) Applicant: Hewlett Packard Enterprise Development LP, Houston, TX (US)

(72) Inventors: Charles F. Clark, Roseville, CA (US); Craig Joseph Mills, Roseville, CA (US); Frank J. Wood, Elk Grove, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 24 days.

(21) Appl. No.: 15/934,824

(22) Filed: Mar. 23, 2018

(65) Prior Publication Data

US 2019/0296982 A1      Sep. 26, 2019

(51) Int. Cl.
    *H04L 12/24*     (2006.01)
    *H04L 29/08*     (2006.01)
    *H04W 24/02*     (2009.01)

(52) U.S. Cl.
    CPC ......... *H04L 41/22* (2013.01); *H04L 41/0866* (2013.01); *H04L 67/12* (2013.01); *H04L 67/14* (2013.01); *H04W 24/02* (2013.01)

(58) Field of Classification Search
    CPC ..... H04L 41/0866; H04L 41/22; H04L 67/12; H04L 67/14

(Continued)

(56) References Cited

U.S. PATENT DOCUMENTS 6,992,991 B2    1/2006   Duske et al.
7,062,546 B1    6/2006   Kolar et al.
(Continued)

FOREIGN PATENT DOCUMENTS

EP    2109254 A1    10/2009

OTHER PUBLICATIONS

Huang, Z, et al., SAIC: Identifying Configuration Files for System Configuration Management, (Research Paper), Nov. 6, 2017, 17 Pgs.

(Continued)

*Primary Examiner* — Glenton B Burgess
*Assistant Examiner* — Patrick F Ngankam
(74) *Attorney, Agent, or Firm* — Nolte Intellectual Property Law Group

(57) ABSTRACT

A network configuration development environment is disclosed. In particular, an editor configured to interface with multiple network devices simultaneously, to view and adjust their device configuration settings, is provided. The network configuration development environment allows a system administrator to manage configuration definitions (e.g., runtime or start-up device configuration parameters) relative to a plurality of network devices simultaneously to achieve correctness and appropriate consistency for each of those devices in a network infrastructure. The network development environment may include an ability to apply changes directly to one or more network devices or to apply changes to stored "configuration files" that are associated with individual devices. Changes to stored configurations may be applied automatically, for example, within a maintenance window for the network, in a controlled manner with a "roll-back" capability in the event of failure or unexpected result as a consequence of the automatically applied changes.

20 Claims, 13 Drawing Sheets

(58) Field of Classification Search
USPC .......................................................... 709/221
See application file for complete search history.

(56) References Cited

U.S. PATENT DOCUMENTS

| | | | |
|---|---|---|---|
| 7,130,870 B1 | 10/2006 | Pecina et al. | |
| 8,060,862 B2 | 11/2011 | Eldridge et al. | |
| 8,156,213 B1* | 4/2012 | Deng | H04L 41/084 709/223 |
| 8,248,958 B1* | 8/2012 | Tulasi | H04L 43/50 370/250 |
| 8,291,403 B2 | 10/2012 | Li et al. | |
| 8,589,531 B2 | 11/2013 | Mollitor | |
| 8,736,611 B1 | 5/2014 | Tulasi | |
| 8,938,489 B2 | 1/2015 | Suit et al. | |
| 9,088,491 B2 | 7/2015 | Vaidya et al. | |
| 9,094,299 B1 | 7/2015 | Rao et al. | |
| 9,170,926 B1 | 10/2015 | Cohen et al. | |
| 9,247,436 B2 | 1/2016 | Moore et al. | |
| 9,369,431 B1 | 6/2016 | Kirby et al. | |
| 9,600,386 B1 | 3/2017 | Thai et al. | |
| 10,148,506 B1 | 12/2018 | Anburose et al. | |
| 2003/0208579 A1 | 11/2003 | Brady et al. | |
| 2004/0148367 A1 | 7/2004 | Takano et al. | |
| 2004/0221262 A1* | 11/2004 | Hampapuram | G06F 8/33 717/113 |
| 2005/0174994 A1 | 8/2005 | Park | |
| 2006/0206864 A1 | 9/2006 | Shenfield et al. | |
| 2007/0168493 A1 | 7/2007 | Sarwono et al. | |
| 2008/0101419 A1 | 5/2008 | Suriyanarayanan | |
| 2009/0276771 A1 | 11/2009 | Nickolov et al. | |
| 2011/0213480 A1 | 9/2011 | Zila et al. | |
| 2012/0209867 A1 | 8/2012 | Agarwal et al. | |
| 2013/0010626 A1 | 1/2013 | Turcanu et al. | |
| 2013/0166774 A1 | 6/2013 | Pruthi et al. | |
| 2013/0182712 A1* | 7/2013 | Aguayo | H04L 41/12 370/395.53 |
| 2013/0254524 A1 | 9/2013 | Snapir et al. | |
| 2014/0280833 A1* | 9/2014 | Gao | H04L 41/0863 709/223 |
| 2015/0220426 A1 | 8/2015 | Spektor et al. | |
| 2016/0224910 A1 | 8/2016 | Deng et al. | |
| 2016/0291942 A1 | 10/2016 | Hutchison | |
| 2016/0344738 A1 | 11/2016 | Dotan et al. | |
| 2016/0344773 A1 | 11/2016 | Knjazihhin et al. | |
| 2017/0054601 A1 | 2/2017 | Affoneh et al. | |
| 2017/0102833 A1* | 4/2017 | Kodali | G06F 3/0481 |
| 2017/0255866 A1 | 9/2017 | Lambe et al. | |
| 2017/0272316 A1 | 9/2017 | Johnson et al. | |
| 2017/0308391 A1 | 10/2017 | Nakanoya et al. | |
| 2018/0026834 A1 | 1/2018 | Dec et al. | |
| 2018/0069752 A1 | 3/2018 | Igarashi | |
| 2018/0131745 A1 | 5/2018 | Shakir et al. | |
| 2018/0136931 A1 | 5/2018 | Hendrich et al. | |
| 2019/0108041 A1 | 4/2019 | D'Ercoli et al. | |

OTHER PUBLICATIONS

Configuration Editor Tool (svcconfigeditor.exe), (Web Page), Mar. 30, 2017, 21 Pgs.

Langemak, J., Streamlining Network Change Validation and Testing, (Web Page), Jun. 4, 2016, 9 Pgs.

Droms, "Dynamic Host Configuration Protocol", RFC 2131, 1997 (Year: 1997).

Enns et al., "Network Configuration Protocol (NETCONF)", RFC 6241, 2011 (Year: 2011).

Enns, "NETCONF Configuration Protocol", RFC 4741, 2006 (Year: 2006).

European Search Report and Search Opinion Received for EP Application No. 19163649.7, dated May 14, 2019, 8 pages.

European Search Report and Search Opinion Received for EP Application No. 19163655.4, dated May 14, 2019, 8 pages.

European Search Report and Written Opinion received for EP Patent Application No. 19163658Z, dated Jul. 31, 2019, 8 pages.

Kundrat et al., "YANG/NETCONF ROADM: Evolving Open DWDM Toward SDN Applications", vol. 36, No. 15. 2018, 10 pages.

Merriam-Webster, "Definition of Augment", 2018, 1 page.

Pugdeethosapol et al., "Dynamic Configuration of the Computing Nodes of the ALICE O2 System," IEEE, 2016 13th International Joint Conference on Computer Science and Software Engineering (JCSSE), 2016, 5 pages.

* cited by examiner

```
hostname 8400-2
user admin group administrators password ciphertext AQBapUV4UAygjJIIE
[encrypted text]
[encrypted text]
module 1/1 product-number j1365a
module 1/2 product-number j1365a
vrf staff
vrf student
    sflow collector 9.9.1.1
    sflow collector 9.9.1.3
    sflow collector 9.9.1.2
    sflow agent-ip 9.9.9.17
clock timezone hongkong
ntp server 118.143.18768 minpoll 4 maxpoll 5 iburst
!
!
!
snmp-server vrf default
snmp-server community aruba123
snmp-server host 192.168.91.101 trap version v2c community aruba123
router vrrp enable
ssh server vrf default
ssh server vrf mgmt
usb
!
!
!
!
router ospf 1
    router-id 1.1.1.1
vlan 1,309,887-888,900-902
vlan 887
    name staff
vlan 888
    name student
vlan 900
    name Uplink_VLAN_to_7010
vlan 901-902
spanning-tree
interface mgmt
    no shutdown
    ip static 10.255.255.2/24
    nameserver 8.8.8.8 8.8.4.4
access-list ip ouhktest
access-list ip ouhk-test
    5 permit ospf any any count
    10 permit tcp any any count
    30 permit any any any count
access-list ip ouhk2
class ip test
```

FIGURE 5

Edit Configuration – Different parameter values per switch

| Name |
|---|
| ☑ ros-rt-01 |
| ☑ ros-rt-02 |
| ☑ ros-rt-03 |
| ☑ ros-rt-04 |
| ☑ ros-rt-05 |

605

```
class ipv4 http
    match tcp any any eq 80
    match tcp any any eq 443
    match tcp any any eq 8080
    exit
class ipv4 kazaa
    match tcp any any eq 1214 any
    match tcp any any eq 1214
    exit
class ipv4 gnutella
    match tcp any any range 6346 6347 any
    match tcp any any range 6346 6347
    match udp any any range 6346 6347 any
    match udp any any range 6346 6347
    exit
policy qos PrioritizeSuspectTraffic
    class ipv4 http action rate-limit kbps <rate>
    class ipv4 kazaa action rate-limit kbps 3500
    class ipv4 gnutella action rate-limit kbps 3500
    exit interface all service-policy PrioritizeSuspectTraffic
```

610

| ros-rt-01: | 6000 |
| ros-rt-02: | 600 |
| ros-rt-03: | 6000 |
| ros-rt-04: | 6000 |
| ros-rt-05: | 6000 |

Edit Configuration – Different parameter values per switch

| Name |
|---|
| ☑ ros-rt-01 |
| ☐ ros-rt-02 |
| ☑ ros-rt-03 |
| ☑ ros-rt-04 |
| ☑ ros-rt-05 |

605'

```
class ipv4 http
  match tcp any any eq 80
  match tcp any any eq 443
  match tcp any any eq 8080
  exit
class ipv4 kazaa
  match tcp any eq 1214 any
  match tcp any any eq 1214
  exit
class ipv4 gnutella
  match tcp any range 6346 6347 any
  match tcp any any range 6346 6347
  match udp any range 6346 6347 any
  match udp any any range 6346 6347
  exit policy qos PrioritizeSuspectTraffic
  class ipv4 http action rate-limit kbps 6000
  class ipv4 kazaa action rate-limit kbps 3500
  class ipv4 gnutella action rate-limit kbps 3500
  exit interface all service-policy PrioritizeSuspectTraffic in
```

SYSTEM FOR SIMULTANEOUS VIEWING AND EDITING OF MULTIPLE NETWORK DEVICE CONFIGURATIONS

RELATED APPLICATIONS

This application is related to U.S. patent application Ser. No. 15/934,830, entitled "System and Method to Provide Network Insights for Correct and Efficient Network Configuration," by Charles F. Clark, et al., filed concurrently herewith, which is hereby incorporated by reference in its entirety for all applicable purposes. This application is also related to U.S. patent application Ser. No. 15/934,806, entitled, "System and Method for Validating Correctness of Changes to Network Device Configurations," by Charles F. Clark, et al., filed concurrently herewith, which is hereby incorporated by reference in its entirety for all applicable purposes.

BACKGROUND

Today's infrastructure networks are becoming more and more complicated and including ever increasing numbers of devices with network capabilities. The Internet of Things (IoT) growth represents one growth area that cause corporate networks, for example, to include substantially more network connected devices as compared to their historical requirements. One side-effect of adding such a large volume of connected devices is that infrastructure networks (e.g., corporate private networks) have become more complicated and may require additional network support devices such as routers, bridges, domain name servers, network time protocol (NTP) servers, gateways, etc. Each of these network support devices (or simply network devices) requires a configuration of network parameters in order to function as desired within the possibly complex network architecture. In some cases, network devices require consistency for certain network parameters (e.g., Internet Protocol (IP) address of an NTP server). This is, in part, because there may not be multiple NTP servers within a given network because all devices on the network should have a consistent time reference. In other cases, for example to support a secure subnet, that is restricted from standard network communication traffic, within a lager network infrastructure, certain devices must have different values for the same configuration parameter setting as other device not involved (or allowed access to) the secure subnet. In another simple example, if a system administrator were defining an IP address for an interface in a network (or subnet) it would be important to ensure that the address represents a unique interface (i.e., not a duplicated IP address) in that network portion. Simply put, there are situations when configuration parameter settings are desired to be identical and other situations where the same configuration parameter settings must have a different value for selected network devices.

Prior art methods for maintaining network device parameters have been largely manual with limited "home grown" automation and maintenance capabilities available to system administrators. For example, some system administrators would create templates to store base values for configuration settings used to configure a new device, implement scripted methods to apply bulk changes of data to network devices, or utilize standard multi-file differencing utilities. While providing some perceived assistance, templates could easily become outdated and a change to a value representing a configuration setting in a template required determining which network devices had already been configured based on the now outdated template. Automated bulk changes were additionally problematic, for example, if an error was introduced in bulk, the network may be crashed and difficult to restore. Multi-file diff utilities are limited and typically focus on a very few number of files (e.g., mostly 2 and sometimes 3 files but rarely more). Overall, these approaches do not provide a comprehensive solution to address a network administrator's needs. Further, because of the manual nature and overall complexity of the problem being addressed with non-network aware tools, these approaches often resulted in inadvertent incorrect settings being configured for one or more devices within a network infrastructure. Incorrect configuration settings for network devices may cause undesired network performance, or even network failure. Accordingly, care must be taken when setting or adjusting configuration parameters of network devices.

BRIEF DESCRIPTION OF THE DRAWINGS

For a detailed description of various examples, reference will now be made to the accompanying drawings, in which:

FIG. 5 is a screen shot showing an overlay method of presenting textual data from a plurality of network devices to a system administrator in a single presentation format, according to one or more disclosed implementations;

FIGS. 6A-E illustrate alternative presentation methods that may be used instead of or in addition to the presentation method of FIG. 5;

DETAILED DESCRIPTION

Figure 1:
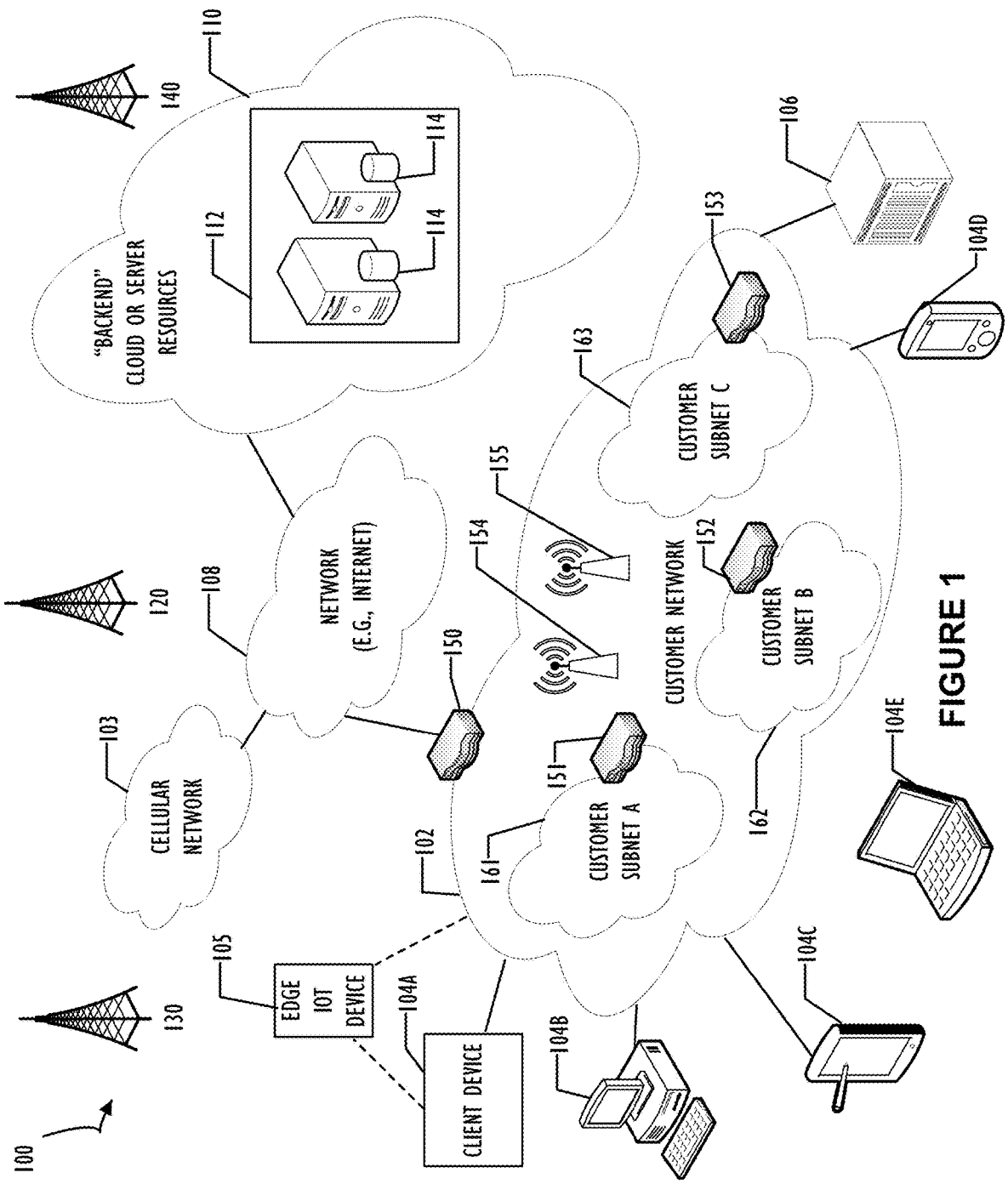
FIG. 1 is a block diagram representing an example of a networked computing infrastructure where implementations of the present disclosure may operate.

This disclosure is directed to a network configuration development environment to improve system administrative interfaces to network devices. In particular, but not by way of limitation, this disclosure is related to an interface to view and edit multiple network configuration definitions relative to a plurality of network devices simultaneously to achieve correctness and appropriate consistency for each of those devices to work in a coordinated, and efficient manner to support a network communication infrastructure.

To address issues related to prior art network administration techniques, this disclosure presents methods and systems to improve the complex technical art of network administration. In particular, the disclosed network administration editor, that is part of an overall network configuration development environment, provides automated error checking, consistency validation, change implementation, and automated roll back of changes. Additionally, the disclosed network administration editor provides a multi-file edit capability that may be useful in areas beyond the field of network administration. The multi-file edit capability allows centralized management of contents of potentially numerous files that typically represent slight variations from a master "draft" file and from each other. Visual clues, and "expert help" may be provided via the editor to assist in maintaining and validating portions of files having different contents from each other and ensuring proper consistency across those files.

In the following description, for purposes of explanation, numerous specific details are set forth in order to provide a thorough understanding of the examples disclosed herein. It will be apparent, however, to one skilled in the art that the disclosed example implementations may be practiced without these specific details. In other instances, structure and devices are shown in block diagram form in order to avoid obscuring the disclosed examples. Moreover, the language used in this disclosure has been principally selected for readability and instructional purposes and may not have been selected to delineate or circumscribe the inventive subject matter, resorting to the claims being necessary to determine such inventive subject matter. Reference in the specification to "one example" or to "an example" means that a particular feature, structure, or characteristic described in connection with the examples is included in at least one implementation.

The term "computing system" is generally taken to refer to at least one electronic computing device that includes, but is not limited to, a single computer, virtual machine, virtual container, host, server, laptop, and/or mobile device or to a plurality of electronic computing devices working together to perform the function described as being performed on or by the computing system. The term also may be used to refer to a number of such electronic computing devices in electronic communication with one another.

As used herein, the term "medium" refers to one or more non-transitory physical media that together store the contents described as being stored thereon. Examples may include non-volatile secondary storage, read-only memory (ROM), and/or random-access memory (RAM). Such media may be optical or magnetic.

As used herein, the terms "application" and "function" refer to one or more computing modules, programs, processes, workloads, threads and/or a set of computing instructions executed by a computing system. Example implementations of applications and functions include software modules, software objects, software instances and/or other types of executable code. Note, the use of the term "application instance" when used in the context of cloud computing refers to an instance within the cloud infrastructure for executing applications (e.g., for a customer in that customer's isolated instance).

As used herein, the term "multi-editor" refers to an editor capable of editing multiple files simultaneously. For example, a number of files representing a set of network devices may be collected and presented to a system administrator (e.g., network administrator) such that information identical to all underlying devices is presented as "normal" text while information that is different in the underlying files may be presented in a "highlighted" manner to identify to the system administrator that there is a difference across the multiple files. In cases where the differences are "expected" (e.g., believed to be intentional based on the nature of the data), a generated "macro" variable may be presented instead of the underlying information. Alternatively, if the differences are "unexpected" (e.g., believed to be a typographical error or configuration error), the presentation may be an overlay of differing text (or other visual clue) to draw further attention to that area of the multi-editor presentation screen. In general, when there are similar and expected variations in underlying data, the multi-editor will not attempt to draw as much attention to that data as it would if the variations were vast and unexpected (e.g., reflective of a typo). Further, variations are not necessarily reflective of the amount of difference in the text but may also take into account the impact of any difference in that data. For example, a single character difference in a network address of an NTP server may have a greater difference than a large amount of character difference in a configuration file comment.

As used herein, a "draft" version of a configuration refers to configuration information (e.g., a configuration file) that is not directly associated with a network device. For example, a master template used for comparison purposes may be stored as a "draft" in the disclosed network configuration repository of information.

As used herein, a "candidate" version of a configuration refers to configuration information (e.g., a configuration file) that is associated with a network device (e.g., switch, router) and contains configuration settings that have not yet been deployed to that network device. For example, saved changes that have not yet been "committed" to a running network but are staged for a coordinated deployment.

As used herein, the term "start-up" when referring to a configuration of a network device is used in its normal and customary sense with respect to network devices and refers to the configuration settings applied to that network device if it is rebooted (e.g., restarted). Changes to a start-up configuration will have no effect on a running network device and will be used the next time that device is restarted.

As used herein, the term "running" when referring to a configuration of a network device is used in its normal and customary sense with respect to network devices and refers to the configuration settings applied to that network device while it is running. The running configuration may or may not match the start-up configuration. For example, a system administrator may change a setting in a running configuration knowing that if the network fails and must be restarted, the change will, upon restart, be reverted back to the start-up configuration.

Referring now to FIG. 1, networked computing infrastructure 100 is illustrated in a block diagram and represents an example in which implementations of the present disclosure may operate. For example, network devices such as switches, routers, gateways, and wireless access points may be configured using the disclosed network configuration development environment described below with reference to FIG. 3. Networked computing infrastructure 100 comprises a customer network 102, network 108, and a "backend" cloud or server resources platform/network 110. In one example, the customer network 102 may be a local private network, such as local area network (LAN) that includes a variety of network devices that include, but are not limited to switches 150, 151, 152, and 153), servers, wireless access points (WAPs) 154-155, and routers. Each of these networks can contain wired or wireless programmable devices and operate using any number of network protocols (e.g., TCP/IP) and connection technologies (e.g., WiFi® networks, Bluetooth®). In another example, customer network 102 represents an enterprise network that could include or be communicatively coupled to one or more local area networks (LANs) that may be implemented as different subnets (e.g., subnet A 161, subnet B 162, and subnet C 153), virtual networks, data centers, and/or other remote networks (e.g., 108, 112).

As shown in FIG. 1, customer network 102 may be connected to one or more client devices 104A-E and allow the client devices to communicate with each other and/or with backend cloud or server resources platform/network 110 (e.g., via network 108). Client devices 104A-E may be computing systems such as desktop computer 104B, tablet computer 104C, mobile phone 104D, laptop computer 104E (shown as wireless), and/or other types of computing systems generically shown as client device 104A. Networked computing Infrastructure 100 may also include other types of devices generally referred to as Internet of Things (IoT) (e.g., edge IOT device 105) that may be configured to send and receive information via a network to access network services or interact with a remote web browser application (e.g., to receive configuration information).

FIG. 1 also illustrates that customer network 102 may be connected to a local compute resource 106 that may include a server, access point, router, or other device configured to provide for local computational resources and/or to facilitate communication amongst networks and devices. For example, local compute resource 106 may be one or more physical local hardware devices configured to communicate with wireless network devices and/or facilitate communication of data between customer network 102 and other networks such as network 108 and backend cloud or server resources platform/network 110. Local compute resource 106 may also facilitate communication between other external applications, data sources, and services, and customer network 102.

Networked computing infrastructure 100 also includes cellular network 103 for use with mobile communication devices. Mobile cellular networks support mobile phones and many other types of mobile devices such as laptops etc. Mobile devices in networked computing infrastructure 100 are illustrated as mobile phone 104D, laptop 104E, and tablet 104C. A mobile device such as mobile phone 104D may interact with one or more mobile provider networks as the mobile device moves, typically interacting with a plurality of mobile network towers 120, 130, and 140 for connecting to the cellular network 103. Although referred to as a cellular network in FIG. 1, a mobile device may Interact with towers of more than one provider network, as well as with multiple non-cellular devices, such as wireless access points 154, 155, and routers (e.g., local compute resource 106). In addition, the mobile devices may interact with other mobile devices or with non-mobile devices such as desktop computer 104B and various types of client devices 104A for desired services.

As Illustrated in FIG. 1, customer network 102 may also include a dedicated network device 150 (e.g., gateway or router) or a combination of network devices 150, 151, 152, and 153, that implement a customer firewall or intrusion protection system. Note that network device 150 may provide one or more of these capabilities for network 102, while network devices 151, 152, and 153 may provide one or more of these capabilities for their respective subnet (161, 162, and 163). Of course, one or more network devices may work together to provide specific security requirements as needed for different portions (e.g., subnets) of a network.

FIG. 1 illustrates that customer network 102 is coupled to a network 108. Network 108 may Include one or more computing networks available today, such as other LANs, wide area networks (WANs), the Internet, and/or other remote networks, in order to transfer data between client devices 104A-E and backend cloud or server resources platform/network 110. Each of the computing networks within network 108 may contain wired and/or wireless programmable devices that operate in the electrical and/or optical domain. For example, network 108 may include wireless networks, such as cellular networks in addition to cellular network 103.

Wireless networks may utilize a variety of protocols and communication techniques (e.g., Global System for Mobile Communications (GSM) based cellular network) wireless fidelity Wi-Fi networks, Bluetooth, Near Field Communication (NFC), and/or other suitable radio-based networks as would be appreciated by one of ordinary skill in the art upon viewing this disclosure. Network 108 may also employ any number of network communication protocols, such as Transmission Control Protocol (TCP) and Internet Protocol (IP). Although not explicitly shown in FIG. 1, network 108 may include a variety of network devices, such as servers, routers, network switches, and/or other network hardware devices configured to transport data over networks.

In FIG. 1, backend cloud or server resources platform/network 110 is illustrated as a remote network (e.g., a cloud network) that is able to communicate with client devices 104A-E via customer network 102 and network 108. Backend cloud or server resources platform/network 110 could alternatively be implemented using systems that are part of customer network 102 (i.e., dedicated customer server resources). However, when implemented using a cloud infrastructure as shown, backend cloud or server resources platform/network 110 acts as a platform that provides additional computing resources to the client devices 104A-E and/or customer network 102.

For example, by utilizing backend cloud or server resources platform/network 110, users of client devices 104A-E may be able to build and execute applications, such as automated processes for various enterprise, IT, and/or other organization-related functions. In one example, backend cloud or server resources platform/network 110 includes one or more data centers 112, where each data center server instance 114 could correspond to a different geographic location. Each data center server instance 114 may be implemented on a physical computing system, such as a single electronic computing device (e.g., a single physical hardware server) or could be in the form a multi-computing device (e.g., multiple physical hardware servers). Examples of data center server instances 114 include, but are not limited to, a web server instance (e.g., a unitary Apache installation), an application server instance (e.g., unitary Java Virtual Machine), and/or a database server instance (e.g., a unitary MySQL catalog).

As is illustrated in FIG. 1, networked computing infrastructure 100 may contain many different network devices that may each require configurations to allow the network(s) as a whole to function properly. Each of these network devices may be maintained and configured using the disclosed network configuration development environment. Further, the disclosed network configuration development environment may also execute on various portions of networked computing infrastructure 100.

Figure 2:
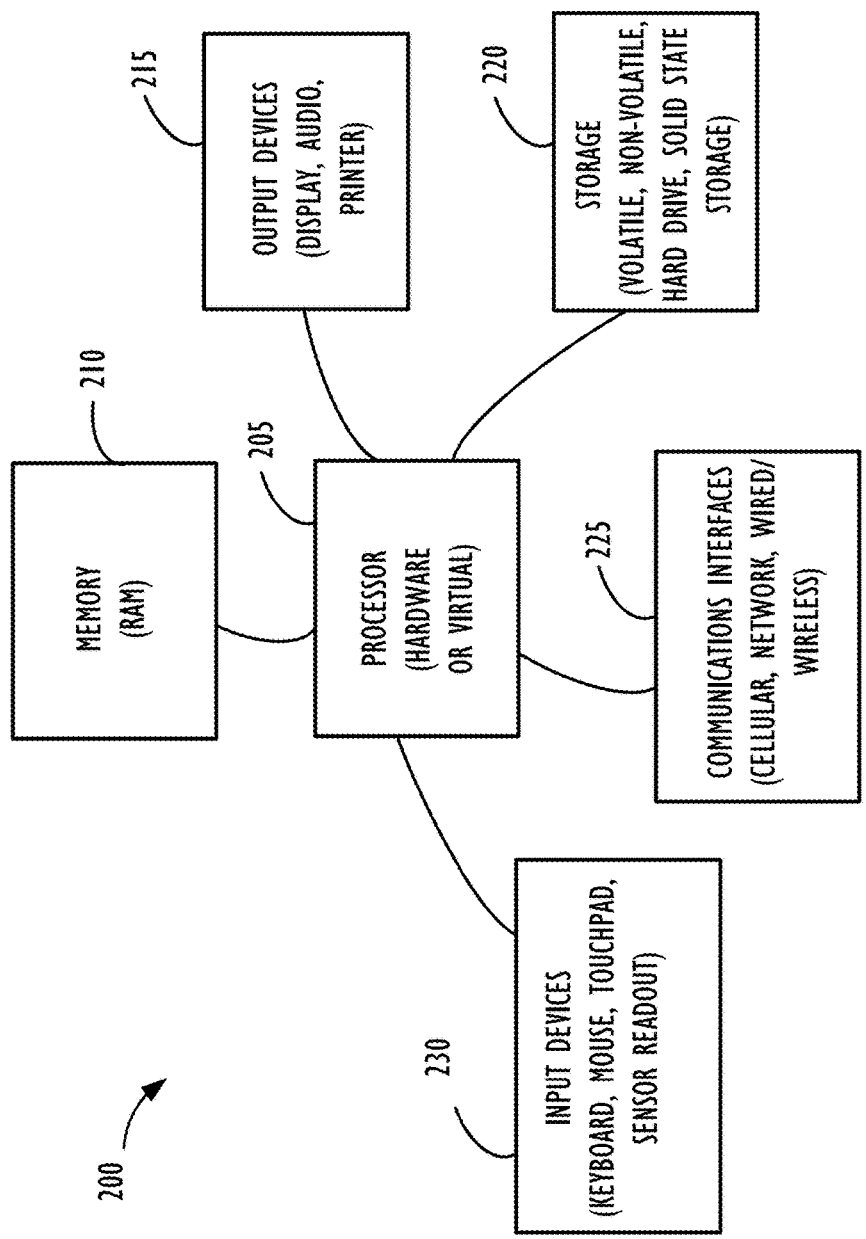
FIG. 2 is high-level block diagram of a computing device that may be configured to perform one or more disclosed methods or processes.

FIG. 2 illustrates a high-level block diagram of a computing device 200 (e.g., computing system or network switch as shown in FIG. 1) that may be used to implement one or more disclosed examples (e.g., a multi-editor as part of a network configuration development environment and the network devices it supports). For example, computing device 200, illustrated in FIG. 2, could represent a client device or a physical server device and could include either hardware or virtual processor(s) depending on the level of abstraction of the computing device. In some instances (without abstraction) computing device 200 and its elements as shown in FIG. 2 each relate to physical hardware. Alternatively, in some instances one, more, or all of the elements could be implemented using emulators or virtual machines as levels of abstraction. In any case, no matter how many levels of abstraction away from the physical hardware, computing device 200 at its lowest level may be implemented on physical hardware.

As also shown in FIG. 2, computing device 200 may include one or more input devices 230, such as a keyboard, mouse, touchpad, or sensor readout (e.g., biometric scanner) and one or more output devices 215, such as displays, speakers for audio, or printers. Some devices may be configured as input/output devices also (e.g., a network interface or touchscreen display). Computing device 200 may also include communications interfaces 225, such as a network communication unit that could include a wired communication component and/or a wireless communications component, which may be communicatively coupled to processor 205. The network communication unit may utilize any of a variety of proprietary or standardized network protocols, such as Ethernet, TCP/IP, to name a few of many protocols, to effect communications between devices. Network communication units may also comprise one or more transceivers that utilize the Ethernet, power line communication (PLC), WI-FI, cellular, and/or other communication methods.

As illustrated in FIG. 2, computing device 200 includes a processing element, such as processor 205, that contains one or more hardware processors, where each hardware processor may have a single or multiple processor cores. In one example, the processor 205 may include at least one shared cache that stores data (e.g., computing instructions) that are utilized by one or more other components of processor 205. For example, the shared cache may be a locally cached data stored in a memory for faster access by components of the processing elements that make up processor 205. In some cases, the shared cache may include one or more mid-level caches, such as level 2 (L2), level 3 (L3), level 4 (L4), or other levels of cache, a last level cache (LLC), or combinations thereof. Examples of processors include, but are not limited to a central processing unit (CPU) microprocessor. Although not illustrated in FIG. 2, the processing elements that make up processor 205 may also include one or more other types of hardware processing components, such as graphics processing units (GPUs), application specific integrated circuits (ASICs), field-programmable gate arrays (FPGAs), and/or digital signal processors (DSPs).

FIG. 2 illustrates that memory 210 may be operatively and communicatively coupled to processor 205. Memory 210 may be a non-transitory medium configured to store various types of data. For example, memory 210 may include one or more storage devices 220 that comprise a non-volatile storage device and/or volatile memory. Volatile memory, such as random access memory (RAM), can be any suitable non-permanent storage device. The non-volatile storage devices 220 can include one or more disk drives, optical drives, solid-state drives (SSDs), tap drives, flash memory, read-only memory (ROM), and/or any other type memory designed to maintain data for a duration time after a power loss or shut down operation. In certain instances, the non-volatile storage devices 220 may be used to store overflow data if allocated RAM is not large enough to hold all working data. The non-volatile storage devices 220 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 205. In one instance, the compiling process of the software program may transform program code written in a programming language to another computer language such that the processor 205 is able to execute the programming code. For example, the compiling process of the software program may generate an executable program that provides encoded instructions (e.g., machine code instructions) for processor 205 to accomplish specific, non-generic, particular computing functions.

After the compiling process, the encoded instructions may then be loaded as computer executable instructions or process steps to processor 205 from storage 220, from memory 210, and/or embedded within processor 205 (e.g., via a cache or on-board ROM). Processor 205 may be configured to execute the stored instructions or process steps in order to perform instructions or process steps to transform the computing device into a non-generic, particular, specially programmed machine or apparatus. Stored data, e.g., data stored by a storage device 220, may be accessed by processor 205 during the execution of computer executable instructions or process steps to instruct one or more components within the computing device 200.

A user interface (e.g., output devices 215 and input devices 230) can include a display, positional input device (such as a mouse, touchpad, touchscreen, or the like), keyboard, or other forms of user input and output devices. The user interface components may be communicatively coupled to processor 205. When the output device is or includes a display, the display can be implemented in various ways, including by a liquid crystal display (LCD) or a cathode-ray tube (CRT) or light emitting diode (LED) display, such as an OLED display. Persons of ordinary skill in the art are aware that the computing device 200 may comprise other components well known in the art, such as sensors, powers sources, and/or analog-to-digital converters, not explicitly shown in FIG. 2.

As mentioned above, this disclosure presents a multi-edit capability that allows a user (e.g., network administrator) to simultaneously view and edit multiple text-based configuration files. In some implementations, the presentation format allows the user to view similarities and differences through a stacked text presentation. In this example implementation, text that is the same across all files may be shown once as common stacked text while text that is different across some files may be shown as a textual variable or textual overlay. Textual variables, when present, may be expanded to view and edit the individual file values associated with the variable. In use, to make a corresponding part of all underlying files the same, changes may be made to the common stacked text. Alternatively, to introduce differences across the files, textual variables may be inserted, and individual file values may be edited. In cases where a user wishes to remove a difference across files, the textual variable may be replaced with common stacked text that will affect all underlying files. In some implementations, the scope of the editor (e.g., files shown and affected by editing) may be temporarily limited, for example, by dynamically selecting a subset of the files for viewing and editing operations.

Thus, the disclosed multi-editor represents an improvement to the art of network configuration and administration by providing an intuitive and concise presentation that enables a network administrator to see the similarities and differences across multiple configuration files, each representative of a network device, and the ability to easily change multiple file contents to be the same or different. Further, controlled deployment of changes to configuration parameters to their corresponding devices, and audit tracking of those changes may be provided.

Figure 3:
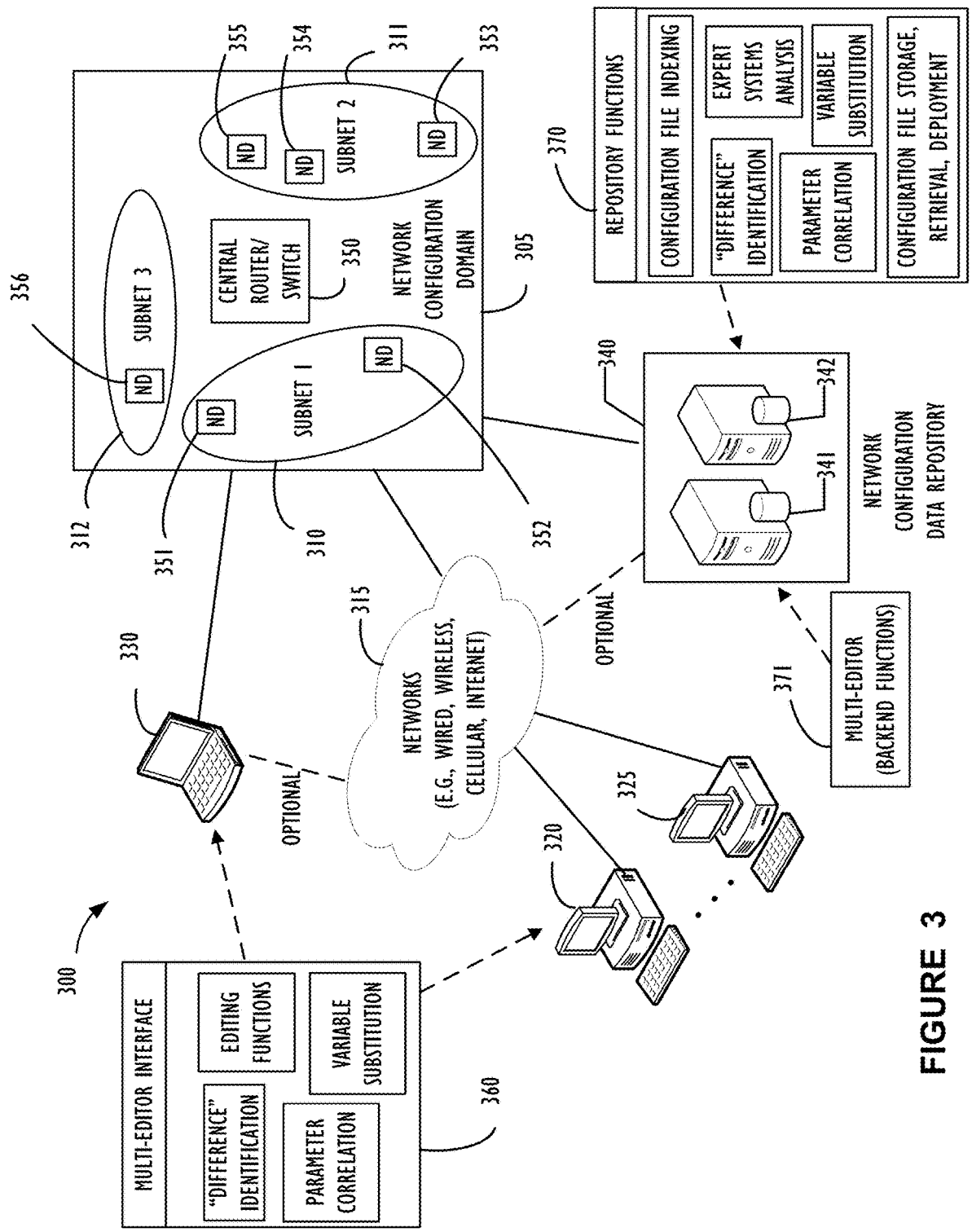
FIG. 3 is block diagram of multiple developer's endpoints connected through a network to a backend processing system configured to support a network configuration development environment, according to one or more disclosed implementations.

Referring now to FIG. 3, block diagram 300 illustrates multiple network administrator endpoints (e.g., computers 320-325, and 330) connected through at least one network to a backend processing system (e.g., network configuration data repository 340) configured to support a network configuration development environment, according to one or more disclosed implementations. Each network administrator endpoint may facilitate execution of the disclosed multi-editor interface 360 for working within a network configuration development environment. Block 360 indicates that multi-editor functions may include, but are not limited to, difference identification; editing functions; variable substitution; and parameter correlation. In general multi-editor interface 360 may be presented as a graphical user interface front-end to an application executing locally or to a remotely executing application and provided via a web interface (e.g., web browser or web application). Some of the functions outlined (e.g., difference identification) may be performed as part of repository functions 370, by multi-editor Interface 360, or by both depending on implementation criteria (e.g., performance and security requirements). Multi-editor 371 may include backend functions that execute alongside repository functions 370 and be connected via a local graphical user interface. Alternatively, the disclosed multi-edit capability may be implemented as a distributed application with functions executing on different processors across a network configuration domain. In some implementations, functions are distributed across a network configuration domain based on performance, security, or convenience reasons and these distributed functions collectively provide the multi-edit capability disclosed herein.

In this example, network configuration data repository 340 is configured to use servers 341 and 342 for maintaining data and performing functions to support a network engineer development environment for network configuration domain 305. Servers 341 and 342 may be configured to maintain data representative of network configuration settings (e.g., parameters) corresponding to individual network devices within network configuration domain 305. This information may be stored logically, for example in a database, and obtained as configuration file representations, or physically as individual files. In either case, the information may be indexed and correlated to support search, update, and deployment capabilities as described herein. That is, individual files may be stored with a one-to-one correspondence to network devices or attributes may be stored within a relational data base such that data may be extracted in a manner to support a proper association with corresponding individual network devices (e.g., a configuration file representation). Block 370 indicates that functions performed by network configuration data repository 340 include, but are not limited to, configuration file indexing; difference identification; parameter correlation; expert systems analysis; variable substitution; and configuration storage, retrieval and deployment. Each of these aspects will be discuss in more detail below.

In the example of FIG. 3, networks 315 represent optional communication networks that are not considered part of network configuration domain 305 but may allow for system administrators to interact with network configuration data repository 340 from remote locations or even mobile devices (e.g., laptop 330).

Continuing with FIG. 3, network configuration domain 305 represents, in this example, a corporate network (e.g., similar to customer network 102 from FIG. 1) that may be maintained by one or more system administrators. In this example, the one or more system administrators may use the disclosed multi-edit interface 360 capability (executing on, for example, computers 320-325, or 330) to interact with network configuration data repository 340 to view and edit configuration parameters for one or more networks devices (351-356) in network configuration domain 305. As shown, network configuration domain 305 includes a central router/switch 350, and three subnets (i.e., subnet 1 310, subnet 2 311, and subnet 3 356). A total of seven network devices (i.e., ND 351, ND 352, ND 353, ND 354, ND 355, ND 356, and central router/switch 350) are shown in network configuration domain 305.

Note that, in practice, there may be hundreds or even thousands of network devices within an actual network configuration domain of a large corporation or enterprise but for simplicity only seven are shown here. In modern corporate networks, most network devices are dedicated switches, routers, or bridges, however, server computers may be configured to perform functions of a network device and may be used in that manner by smaller entities. The concepts of this disclosure are not limited to dedicated network devices and will work advantageously with any existing device configured to support networking functions.

In network configuration domain 305, it is likely that each of the seven network devices will have identical configuration settings for many configuration parameters. For example, there will likely be only one NTP server in the network, and a single DNS master. However, particular parameters may be different on specific devices or groups of devices. For example, all network devices in subnet 1 310 may be similarly configured to each other but have differences for certain parameters than the network devices in subnet 2 311 (which would each have a set of identical parameters). In a specific case, central router/switch 350 may have at least two interface ports with different IP addresses. All devices in subnet 1 310 should be configured to communicate with central router/switch 350 on the first interface port and all devices in subnet 2 311 should be configured to communicate with central router/switch 350 on the second interface port. This may be desired to properly load balance data through central router/switch 350 or may be done for security reasons. In any case, network devices within a network configuration domain such as network configuration domain 305 may be expected to have a large degree of overlap with specific reasons and rationale behind any differences in value for a corresponding parameter setting (e.g., different value for a value that corresponds to an NTP server, or DNS master). Because the disclosed network administrator development environment (e.g., multi-edit capability and network configuration data repository) has "knowledge" of network design, variations in values of configuration parameter settings may be properly identified (e.g., as "expected" or "unexpected") to assist a user managing the network configuration domain.

Figure 4:
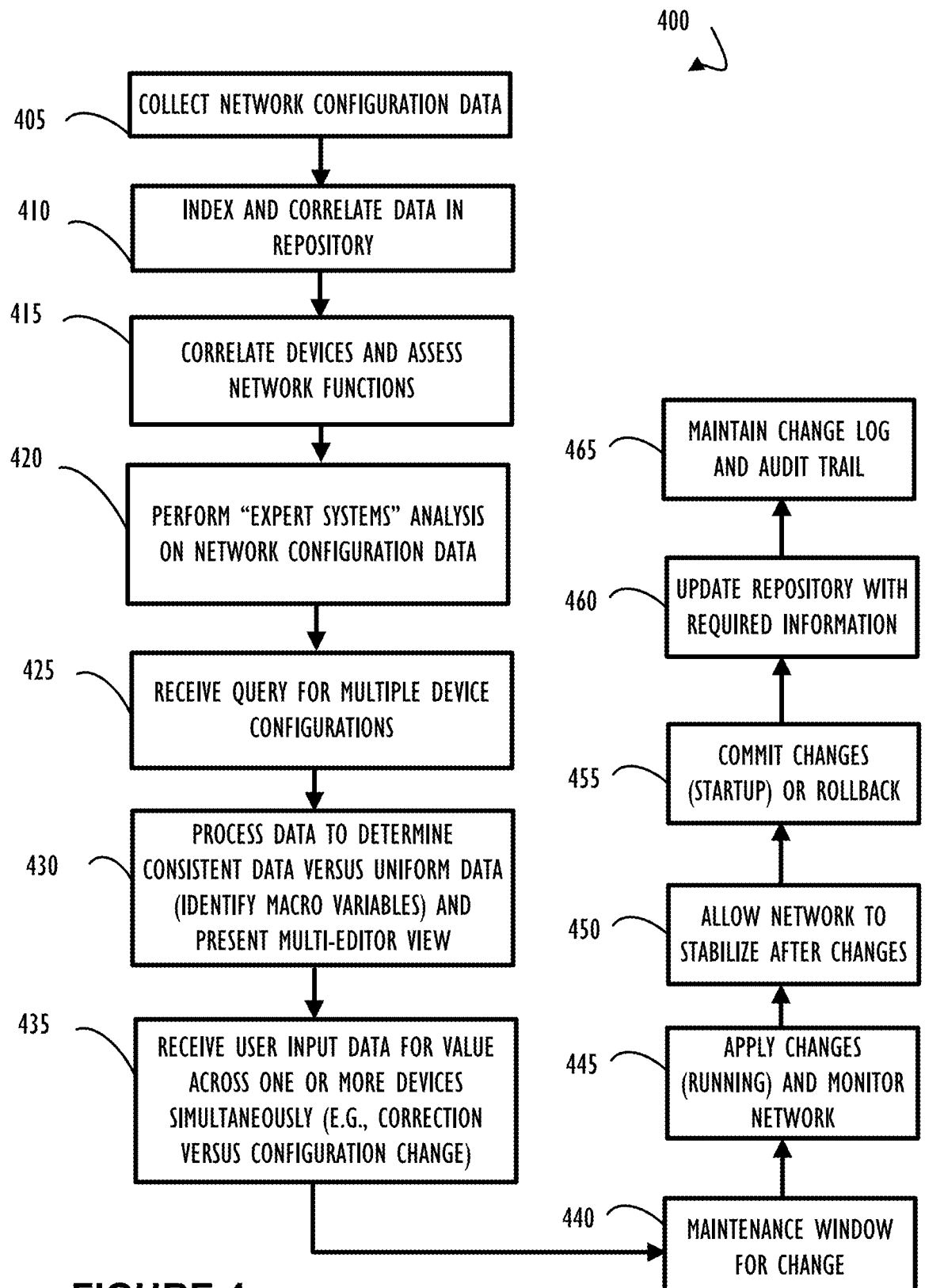
FIG. 4 is a flow chart of a process 400 representing one possible method of collecting and indexing network configuration information, presenting information to and receiving updates from a system administrator, and providing updates to a plurality of network devices in a controlled and audited manner, according to one or more disclosed implementations.

Referring now to FIG. 4, process 400 is illustrated in flow chart form and represents one possible method of collecting and indexing network configuration information, presenting information to and receiving updates from a system administrator, and providing updates to a plurality of network devices in a controlled and audited manner, according to one or more disclosed implementations. Beginning at block 405, network configuration data is collected from an identified network configuration domain (e.g., network configuration domain 305). Data may be manually entered, automatically discovered, or a combination of both.

Block 410 indicates that data may be indexed, correlated and stored in a data repository (e.g., network configuration data repository 340). Block 415 indicates that in addition to standard indexing and correlation techniques, additional techniques that are "network aware" may be used to identify parameters that are expected to be identical across devices and parameters that may be different or required to be unique across devices. Block 420 indicates that "expert systems" techniques, for example machine learning techniques," may also be applied to the network configuration data. Additionally, connection information, such as a hyperlink of parameters to knowledge base information may also be identified as part of the "expert systems" techniques.

Continuing with process 400, once a data repository is configured (e.g., by blocks 405-420), block 425 indicates that a request for multiple device configurations may be received (e.g., from the disclosed multi-editor capability). Block 430 indicates that additional processing may be performed to determine consistent data versus uniform data, for example, to present a multi-editor view. In this context, consistent data refers to data that is expected to be the same and is in fact the same, whereas uniform data refers to data that is expected to be different in some manner and the difference is not more than normal for that type of configuration parameter setting. Uniform data may then be replaced with a "macro variable" so that the variable (possibly highlighted with a visual cue or other indicator) may be presented in the multi-edit view (e.g., a comprehensive editor view for all configuration files within the scope of a current editing session) of multi-editor interface 360 rather than showing a highlighted difference. Finally, differences that are not considered "uniform" may be shown using any one or more of a variety of techniques to bring attention to that data value (see FIGS. 5-7). These differences that are not considered uniform may represent errors in the configuration data that need to be addressed by a network administrator.

Block 435 indicates that user input may be received to alter a data value (e.g., network configuration parameter setting) in one or more devices, for example, because a user edited a value in the multi-editor view. This change may represent a correction of an identified erroneous configuration setting or may simply be a change to "consistent" data that is to be applied across all associated network devices concurrently (e.g., configuration change).

After a set of configuration changes or data value corrections has been identified, block 440 indicates that the system administrator may wait for a pre-defined "maintenance window" in which he is allowed to alter the network configuration. Block 445 indicates that changes may be deployed, from network configuration data repository 340 for example, to a running configuration for each affected network device. Once applied, the network may be monitored to determine if it is functioning acceptably after the change.

Block 450 indicates that the network may be allowed to stabilize after changes because, in some cases, even though changes were applied concurrently, it may take some time for the network to "understand" the configuration changes applied. Block 455 indicates that, if everything is working as expected in the network, changes may be "committed" to network devices by altering their startup configuration settings. Alternatively, if an error occurs (or unexpected results) a rollback may be performed by re-deployment of previous configuration parameter settings to the running configuration or even by initiating a restart of network devices. As explained above, a restart of a network device will cause that device to purge its running configuration and reload from its startup configuration.

Block 460 indicates that the data repository may be updated to reflect the actions performed in this deployment. Block 465 indicates that any change log or audit trail information may also be stored to reflect the time of change, what was changed, and to track who initiated the changes, for example. Additionally, each update (either deployment or commit/save) to a network device may result in a status return that Indicates whether the network device was able to accept the supplied change to configuration. Further, as part of blocks 460 or 465, each network device that was affected may be queried to retrieve its current running (or startup) configuration parameters to verify that they reflect identical information with respect to what was sent to them in the update(s).

FIG. 5 illustrates a screen shot 500 showing an overlay method of presenting textual data from a plurality of network devices to a system administrator in a single presentation format, according to one or more disclosed implementations. The text shown in portion 505 begins with identification of "user admin group" in overlaid text where each of the underlying files contain the same variable name, thus this beginning portion of text appears "bold" but readable. However, the value of the variable shown in the remaining text of block 505 reflects overlaid text where at least some of the underlying files have different characters in corresponding locations resulting in unreadable information.

Block 510 illustrates text in a "soft" representation to indicate that this information may be present in only one (or very few) of the underlying files associated with this view. The NTP server line with element 515 includes both bold overlaid text and, inside element 515, indications of different characters for at least some of the underlying configuration files. Element 520 again begins with bold text indicating that the first portion of this line is identical across all underlying configuration files and ends with element 525 in a "softer" text indicating that this portion stating "community aruba123" is only contained in a subset of all underlying files. Finally, the portion identified by element 530 shows that "vlan 1" has some files that are consistent while others are not consistent and contain extra information (i.e., 900-902 at the end of the line). Screenshot 500 represents an overlay method that may be combined with one or more other visual indicators (see FIGS. 6-7) to convey information about similarities within multiple files brought together in a multi-editor view.

Figure 6C:
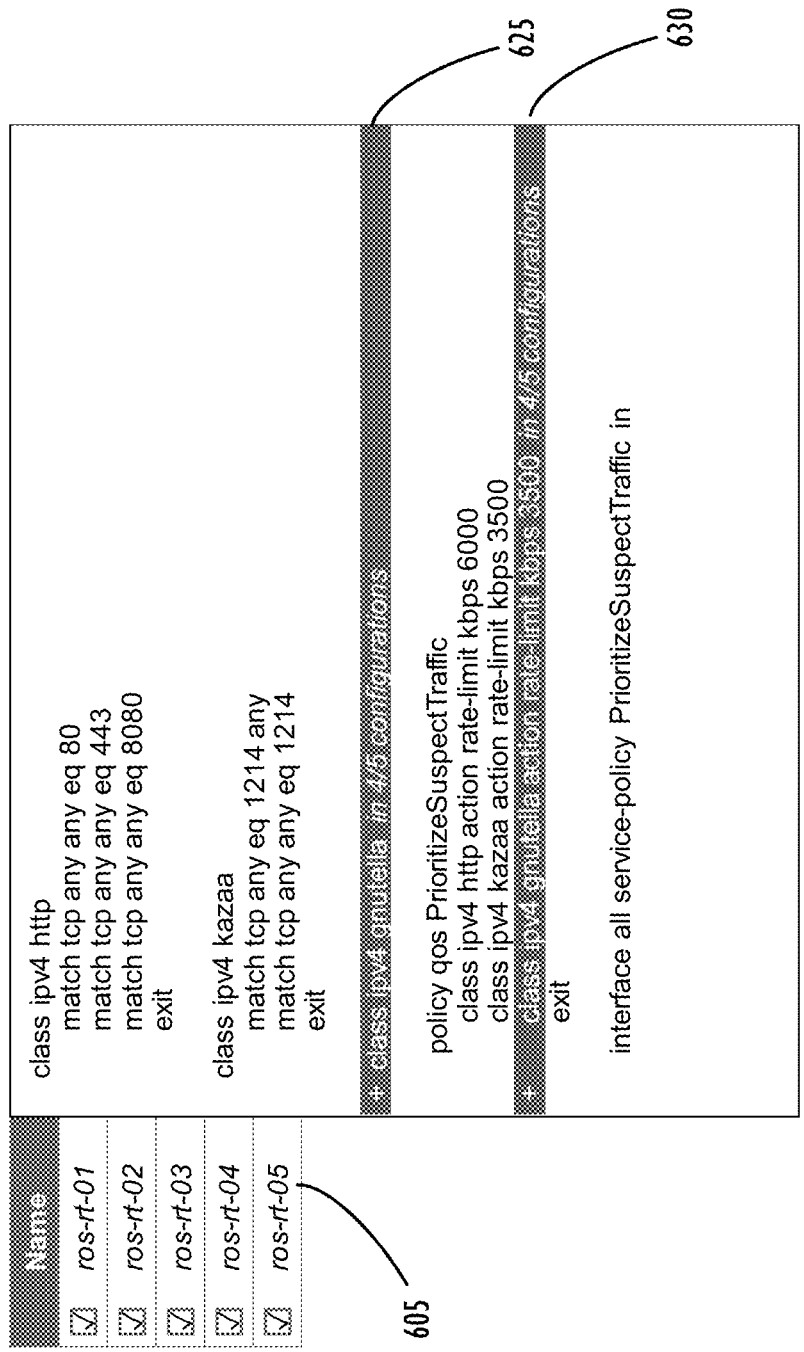

Referring now to FIGS. 6A-E, which each illustrate alternative presentation methods that may be used instead of or in addition to the presentation method of FIG. 5. FIG. 6A illustrates a "scope" of an editor view in block 605 where information from five routers is being processed concurrently. That is, the scope of the edit session is currently set to include five underlying configuration files.

Element 610 illustrates a uniform has been identified and the underlying data has been replaced with the macro variable "rate." In this case, the macro variable is further highlighted because at least one of the underlying files does not have an identical value to the other four routers that are within the scope of this edit session. As illustrated in pop-up dialog 615, it is router 2 that has a value of 600 rather than 6000 as is configured in every other router shown.

Referring now to FIG. 6B, the scope of the edit session has been changed as indicated by block 605'. In this case, router 2 has been de-selected. As a result of this de-selection, the scope of the edit session has changed to only four routers and each of those routers have consistent information (at least as far as what is currently shown in the view of this example).

Element 620 indicates that the "rate" variable has been removed because it is no longer necessary and is replaced with information reflecting the consistent value 6000 for all four routers (i.e., 1, 3, 4, and 5) within the current scope of this edit session. As will be understood, the scope of the edit session affects the presentation format and also affects how changes to data within an edit session will be applied to the underlying configuration information. Only devices for which the scope of the session is set will "participate" in the edit session at that time.

As explained above, data within a configuration repository may be indexed and thus may be searched by regular expressions (e.g., *-rt-* may return all routers) or other search criteria in order to assist in setting a proper scope for an edit session. For example, the system administrator may provide a search string and the multi-editor may provide a view that includes all devices matching that search criteria with all devices selected and participating in the scope of the edit session until such time as a user may refine the search or de-select the devices corresponding checkbox. As an option, a system administrator may include a "draft" configuration within the scope of an edit session. Recall, that a draft configuration is a configuration that does not represent an actual device and may be considered as a kind of master template for configuration settings.

There may be different draft configurations stored within a data repository for different types of network devices, for example. Use of a draft configuration may assist in configuring new devices or ensuring that existing devices maintain conformance with an overall network configuration design. Further, if a change is made in which a draft configuration is within the scope of the edit session, that edit session may automatically update the draft configuration so that future use of the draft will include current information.

Referring now to FIG. 6C, the scope of the edit session includes five routers as indicated by the five checked boxes in block 605. Collapsed summary lines 625 and 630 indicate that their respective information is currently found in only 4 of the 5 underlying configurations. This is illustrated by the italicized text stating "in 4/5 configurations."

Figure 6D:
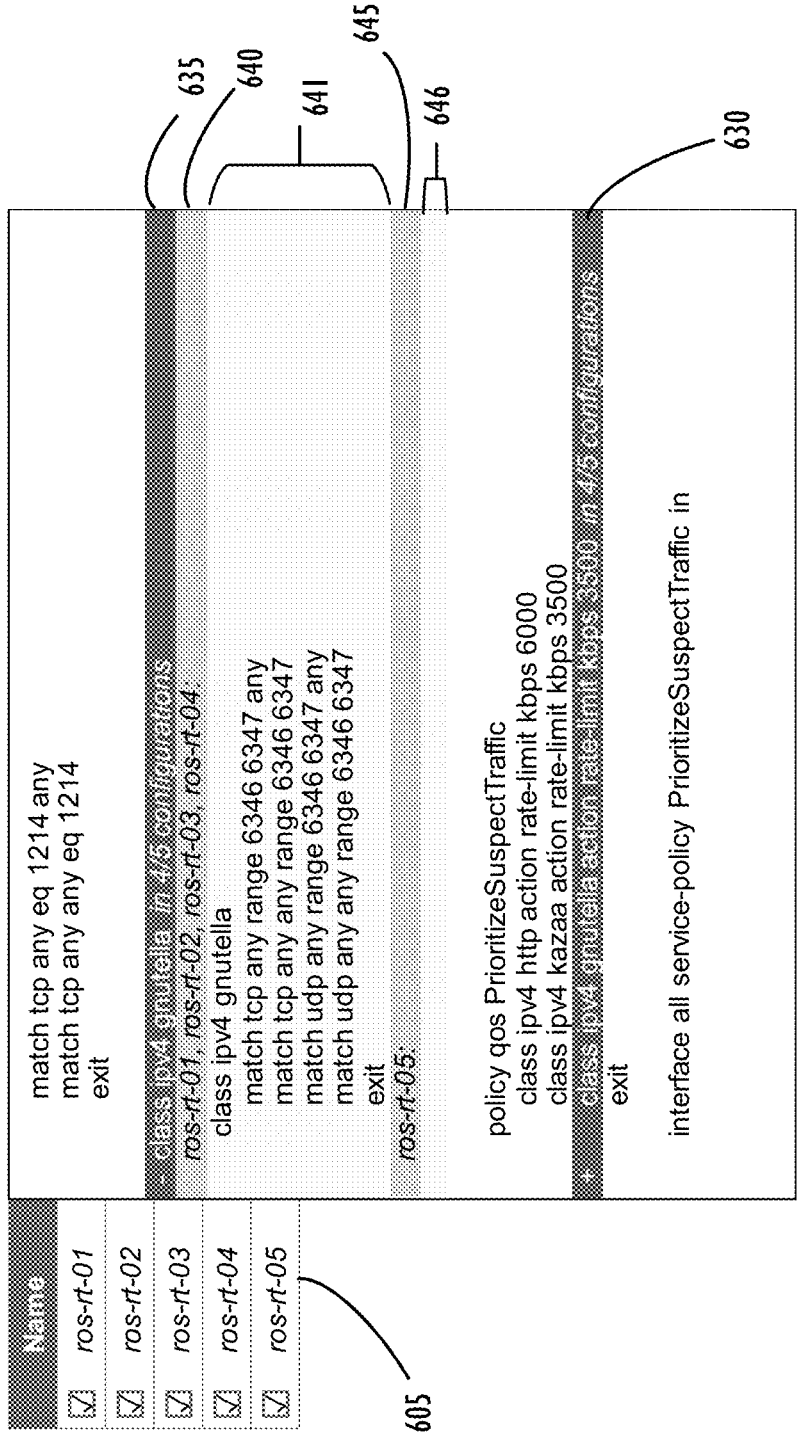

FIG. 6D illustrates what might be presented in response to a user expanding summary line 635. In this example, summary line 635 is expanded and line 640 indicates that the four routers containing consistent information for this configuration information are routers 1, 2, 3, and 4. The specific configuration information that is consistent across those four routers is shown by lines bracketed by element 641. Line 645 and the lines bracketed by element 646 show that the information for router 5 with respect to the variable identified on line 635 is empty. In this manner a network administrator may recognize that configuration information is simply missing from some devices rather than those devices having corresponding but not consistent configuration information.

Figure 6E:
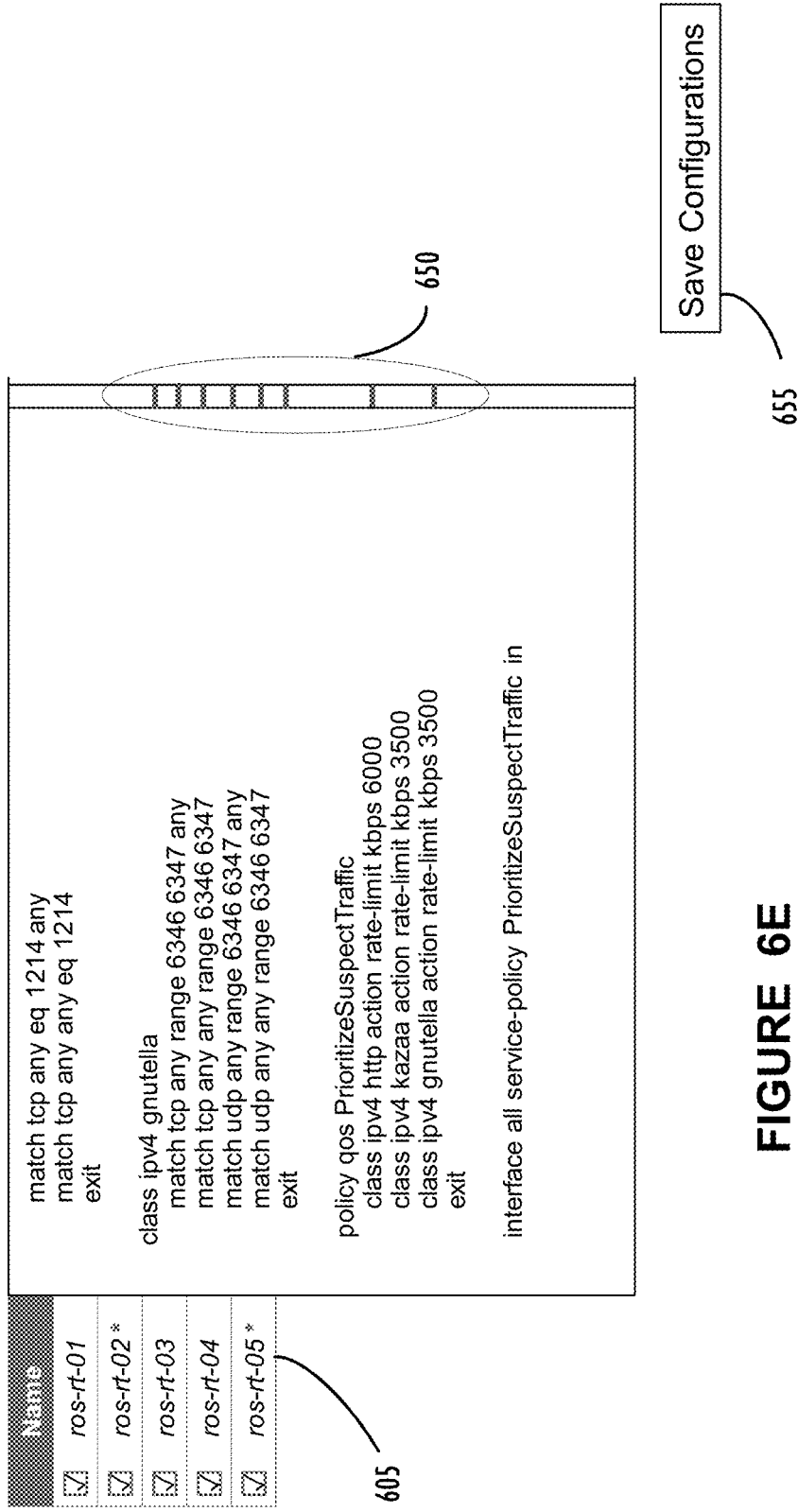

Referring to FIG. 6E, block 605 indicates that the scope of the edit session is set to five routers (i.e., 1, 2, 3, 4, and 5). In side block 605 there is an asterisk next to router 2 and router 5. On the right-hand side of the edit pane there are change bars identified by element 650. The change bars and asterisks, in this example presentation format, are used to inform a system administrator that the lines having change bars represent a potential change to the routers that have an asterisk. Accordingly, this view shows that there are eight changes (there are eight individual change bars) that would be deployed and affect only routers 2 and 5 if the save configurations pushbutton 655 were selected. Note that not all eight changes are necessarily applied to both routers 2 and 5 in this example. Instead, at least one of the eight changes would be applied to each of routers 2 and 5 (up to and including applying all eight changes to both routers).

In some example implementations, multiple individual editing sessions may be performed prior to deployment of changes within the network configuration domain. In this manner, multiple editing sessions of varying scope may be performed to adjust network configuration parameter settings across different sets or different types of network devices. The sum of the scope of each of these multiple editing sessions may be thought of as a "collective scope." As a result, the changes from the multiple editing sessions may be deployed as a single update to the network configuration domain (e.g., at the next appropriate maintenance window).

Figure 7A:
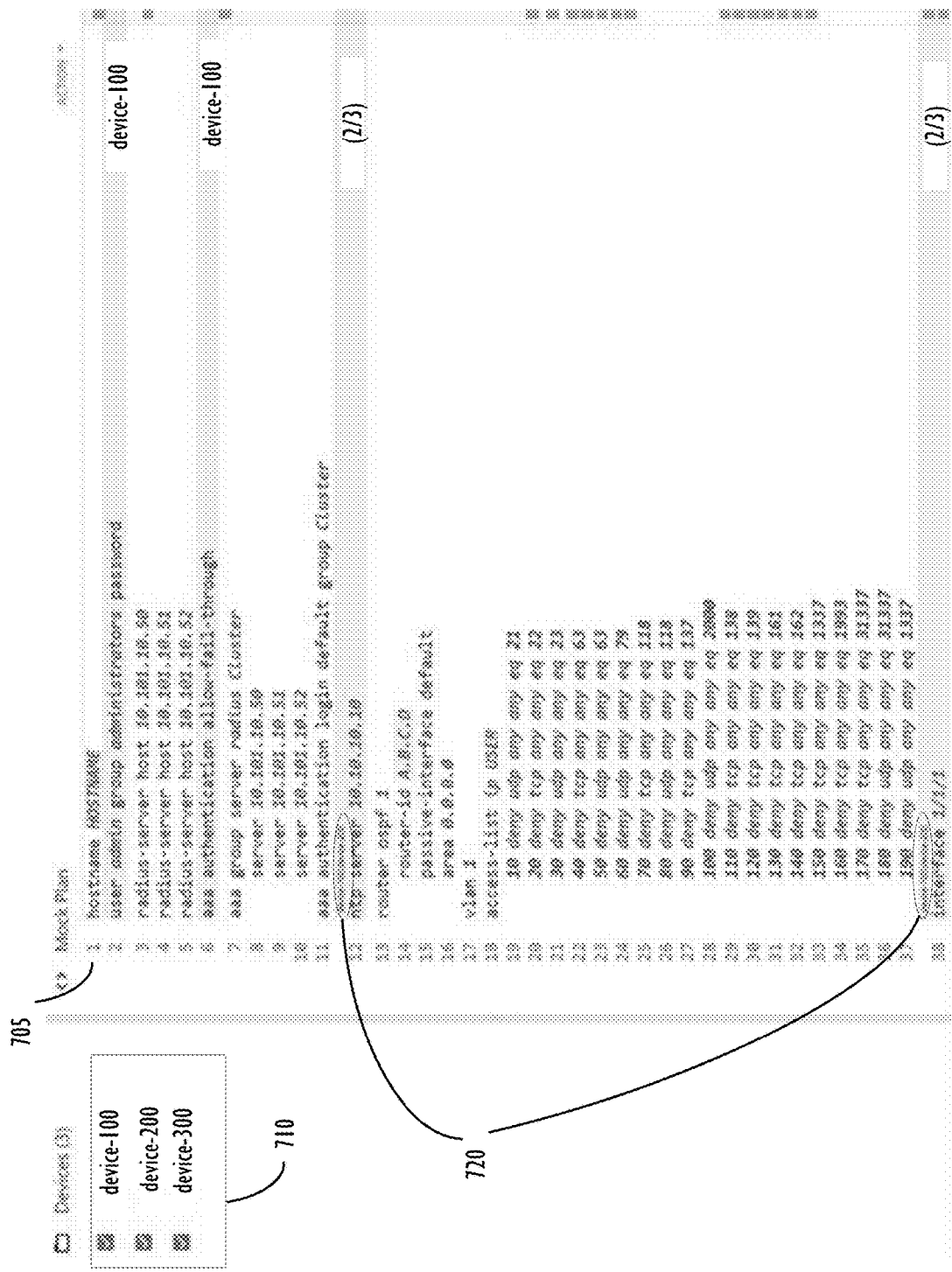
FIGS. 7A-B illustrate screen shots illustrating yet another presentation method using color coding, mouse hovering capabilities, and other visual clues for presenting a multi-file editing capability to a system administrator, according to one or more disclosed Implementations.
Figure 7B:
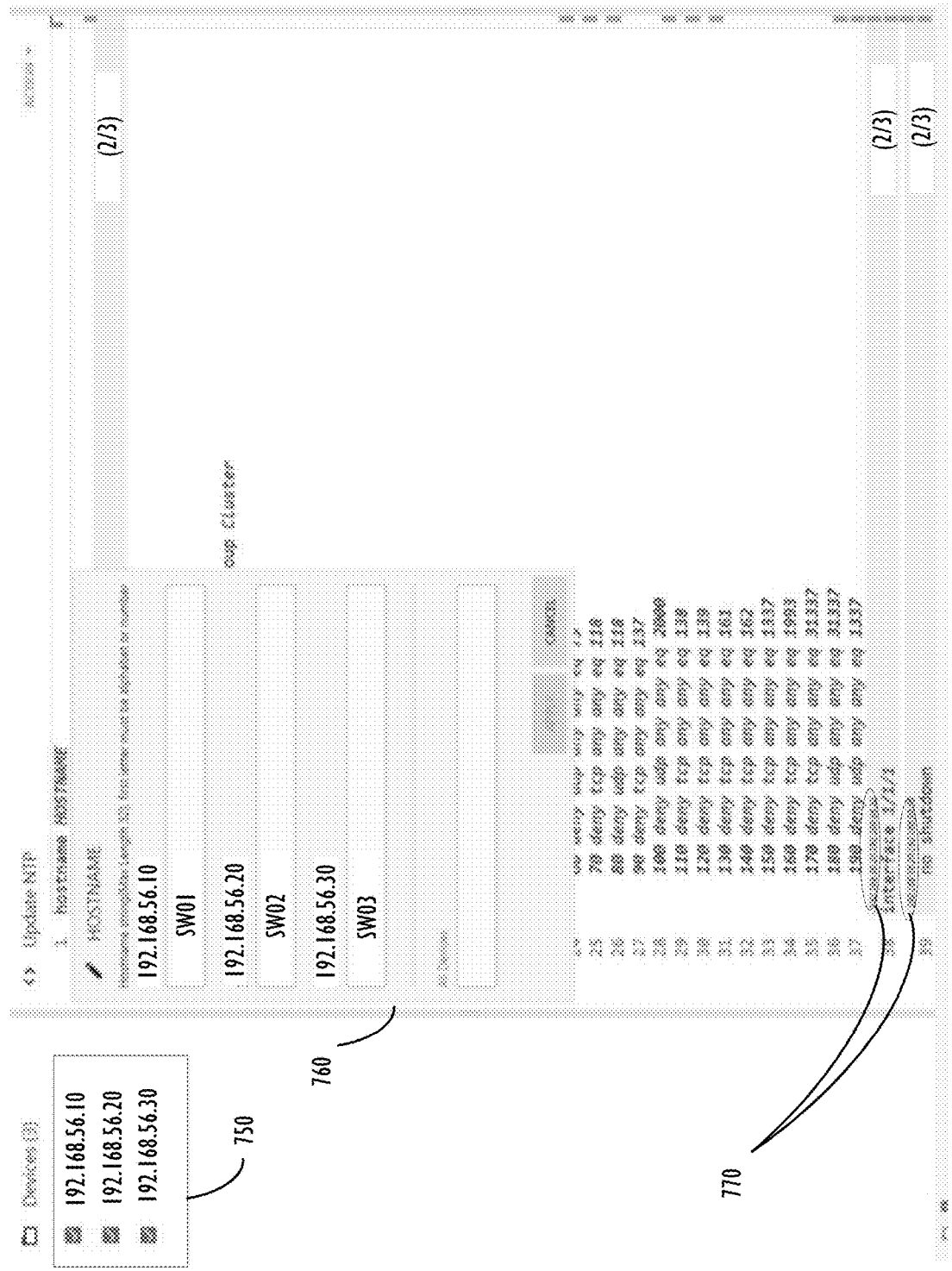

Referring now to FIGS. 7A-B, two screen shots are shown to illustrate yet another presentation method using color coding, mouse hovering capabilities, and other visual clues for presenting a multi-file editing capability to a system administrator, according to one or more disclosed implementations. In FIG. 7A, element 710 identifies that three devices (i.e., device-100, device-200, and device-300) are within the scope of this edit session. Line numbers are referenced by element 705 and line 1 shows a macro variable represented by an italicized "HOSTNAME" has been inserted in place of the underlying data. If a user were to hover over, or select, for example the macro variable "HOSTNAME," then values representative of that configuration parameter setting for different hosts (with like values possibly grouped together) may be presented in a pop-up style dialog box (example shown in FIG. 7B). Lines 2 and 6 also show macro variables for "admin" and "administrators" with an indication on the right-hand side to show that this macro variable was only found for device-100.

Note that the knowledge system of the configuration data repository may identify macro variables for items that have only one occurrence within the current scope of an editing session. Line 12 represents the next line in the current edit view across three files that is different. Line 12 represents the 'ntp server . . . ' configuration line. In this case, there are two (of the 3) files that have this line and one file does not have this line. This situation is highlighted by the annotation on the right noting '(2/3)'. Because some implementations may need to be able to scale up to many files, numbers may be shown when more than 1 file has the same information, but not all the files (e.g., 993/1000). Device names may also be placed in a preface line (small text above the line as shown by element 720 for lines 12 and 38). In this case, the preface text for both lines 12 and 38 is 'device-100, device-200'. This preface line may be collapsed by default, so an administrator would only see the blue background and the right annotation-indicating this line is not in all files, and how many have it. To show the preface line, the system administrator might click on a '+' sign on that line (not shown in FIG. 7). On line 14, the router ids are different per switch. Accordingly, this is displayed with a macro variable "A.B.C.D" in a similar manner to line 1. Finally, for this example, on line 38, two of the three (i.e., 2/3) files have consistent information for this line (similar to line 12).

Turning to FIG. 7B, element 750 indicates that three devices are selected for the current edit session. Dialog box 760 illustrates the effect of hovering over or selecting the macro variable "HOSTNAME" on line 1. That is, the value of the hostname parameter setting for the three switches (i.e., SW01, SW02, and SW03) is shown in the dialog box. In this case, the hostname parameter setting is expected to be unique for each switch. In dialog box 760, each value for the hostname parameter setting is further associated with its' corresponding device identifier (in this case IP address from block 750). Using the fields in dialog box 760, the network administrator can change the individual values for the three switches. Small prefix text (reference element 770) and the right-hand annotation ("2/3") is shown for lines 28 and 29. In this example, the prefix text identifies the IP address for each of the two out of three devices that have this parameter setting value (it is not present in device 192.168.56.10 in this example).

Figure 8:
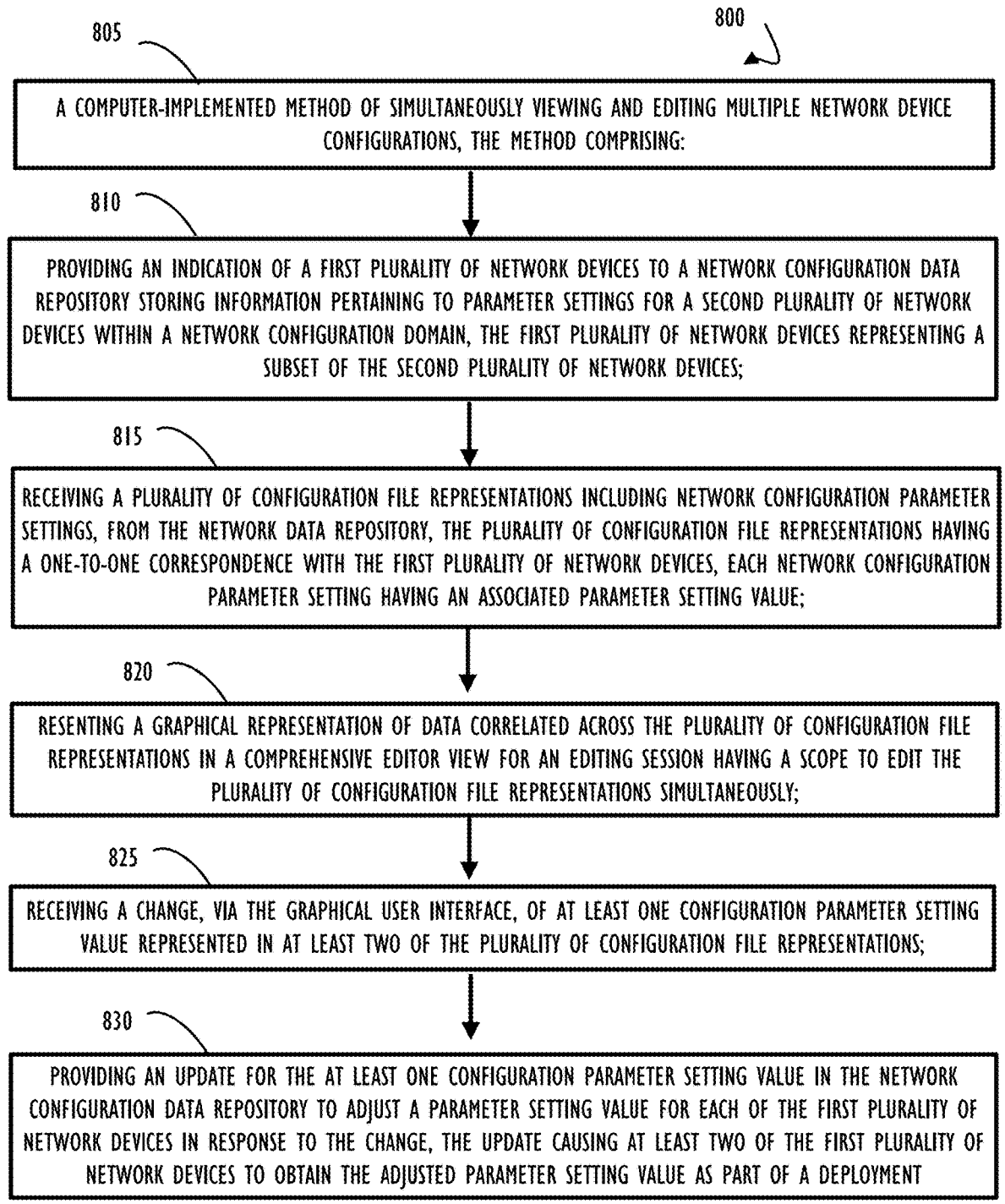
FIG. 8 is a flow chart representing one particular embodiment of a method practiced in accordance with at least some aspects of the present invention.

FIG. 8 is a flow chart representing one particular embodiment of a method practiced in accordance with at least some aspects of the present disclosure. Beginning at block 805, a computer is configured to implement a method, for example, by storing instructions in a memory to cause one or more processing units to perform the method. In this example the implemented method is a method of simultaneously viewing and editing multiple network device configurations. Block 810 indicates that the method includes providing an indication of a first plurality of network devices to a network configuration data repository storing information pertaining to parameter settings for a second plurality of network devices within a network configuration domain, the first plurality of network devices representing a subset of the second plurality of network devices. Block 815 indicates that the method includes receiving a plurality of configuration file representations including network configuration parameter settings, from the network data repository, the plurality of configuration file representations having a one-to-one correspondence with the first plurality of network devices, each network configuration parameter setting having an associated parameter setting value. Block 820 indicates that the method includes presenting a graphical representation of data correlated across the plurality of configuration file representations in a comprehensive editor view for an editing session having a scope to edit the plurality of configuration file representations simultaneously. Block 825 indicates that the method includes receiving a change, via the graphical user interface, of at least one configuration parameter setting value represented in at least two of the plurality of configuration file representations. Finally, block 830 indicates that the method includes providing an update for the at least one configuration parameter setting value in the network configuration data repository to adjust a parameter setting value for each of the first plurality of network devices in response to the change, the update causing at least two of the first plurality of network devices to obtain the adjusted parameter setting value as part of a deployment.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various implementations of the present disclosure. Numerous variations and modifications will become apparent to those skilled in the art once the above disclosure is fully appreciated. It is Intended that the following claims be interpreted to embrace all such variations and modifications.

What is claimed is:

1. A computer-implemented method of simultaneously viewing and editing multiple network device configurations, the method comprising:
   obtaining, by an editing system on a device, a plurality of configuration files from a network data repository, wherein the plurality of configuration files include respective configuration information of a plurality of network devices in a network, wherein configuration information of a respective network device comprises one or more parameter values associated with the network device;
   presenting, in a user interface of the editing system, a graphical representation of correlated data from the plurality of configuration files-, wherein the user interface facilitates an editing session with a scope to edit the correlated data in the plurality of configuration files simultaneously based on the graphical representation;
   receiving a change, at the user interface via the graphical representation, of at least one parameter value represented in at least two of the plurality of configuration files; and
   providing an update comprising the changed parameter value to the network data repository, wherein the update causes at least two of the plurality of network devices to obtain the changed parameter value.

2. The method of claim 1, wherein the change represents a change to the at least one parameter value for a respective configuration file within the scope of the editing session.

3. The method of claim 1 further comprising:
   obtaining a logical representation of a configuration file retrieved in response to a database query to the network data repository; and
   retrieving at least a subset of the plurality of configuration files from the logical representation.

4. The method of claim 1, wherein each of the plurality of configuration files includes configuration information of a corresponding network device within the network.

5. The method of claim 1, further comprising presenting, in the graphical representation in the user interface, at least one configuration setting using a macro variable representing at least two underlying parameter values.

6. The method of claim 5, further comprising expanding the macro variable in response to a user action on the graphical representation in the user interface to display the at least two underlying parameter values and an indication of a prevalence of the at least two underlying parameter values within the scope of the editing session.

7. The method of claim 6, wherein the user action comprises hovering over or selecting the macro variable using the graphical representation in the user interface.

8. The method of claim 1, wherein one of the plurality of configuration files is a draft configuration file representing guidelines for parameter settings rather than parameter values associated with a particular network device.

9. The method of claim 1, wherein providing the update comprising the at least one changed parameter value further comprises:
providing a candidate version of the at least two configuration files for storage in the network data repository prior to deploying the update to the at least two of the plurality of network devices.

10. The method of claim 1, further comprising:
sending an instruction to initiate deployment of a unified update, which indicates a set of updates to the plurality of network devices within a collective scope of a plurality of editing sessions.

11. The method of claim 1, wherein the network data repository is reachable via the Internet.

12. The method of claim 1, wherein the network comprises a plurality of logically separated subnets.

13. The method of claim 12, wherein at least one of the plurality of logically separated subnets includes a secure subnet protected from standard network communication traffic of the network.

14. The method of claim 1, further comprising:
receiving an indication to alter a scope of the editing session to remove at least one configuration file from a simultaneous view of the graphical representation;
updating, in the user interface, the graphical representation to reflect the removal of the at least one configuration file; and
receiving an update to a parameter value of the at least one configuration file and storing the update without affecting any configuration settings of a device associated with the at least one configuration file.

15. The method of claim 14, wherein updating the graphical representation comprises updating the graphical representation to replace at least one macro variable with an underlying value.

16. The method of claim 1, further comprising presenting, in the user interface, at least one visual cue indicating underlying differences in parameter values.

17. The method of claim 1, wherein the plurality of network devices include one or more of: a router; a switch; a domain name server; a web server; a virtual machine; a database server; a network address translation server; a firewall; an application server; a remote access server; a bridge; a client device; and a network gateway.

18. A non-transitory computer readable medium comprising computer executable instructions stored thereon that, when executed by one or more processing units, perform a method to provide a view and edit function to simultaneously view and edit multiple network device configurations, the method comprising:
obtaining, by an editing system on a device, a plurality of configuration files from a network data repository, wherein the plurality of configuration files include respective configuration information of a plurality of network devices in a network, wherein configuration information of a respective network device comprises one or more parameter values associated with the network device;
presenting, in a user interface of the editing system, a graphical representation of correlated data from the plurality of configuration files, wherein the user interface facilitates an editing session with a scope to edit the correlated data in the plurality of configuration files simultaneously based on the graphical representation;
receiving a change, at the user interface via the graphical representation, of at least one parameter value represented in at least two of the plurality of configuration files; and
providing an update representation the changed parameter value to the network data repository for updating the at least two of the plurality of configuration files, wherein the update causes at least two of the plurality of network devices to obtain the changed parameter value.

19. A computer system, comprising:
a network communications interface;
a memory; and
one or more processing units, communicatively coupled to the memory and the network communications interface, wherein the memory stores instructions, that when executed by the one or more processing units, cause the one or more processing units to provide an editing system to simultaneously view and edit multiple network device configurations, the editing system is to:
obtain a plurality of configuration files from a network data repository, wherein the plurality of configuration files include respective configuration information of a plurality of network devices in a network, wherein configuration information of a respective network device comprises one or more parameter values associated with the network device;
present, in a user interface of the editing system, a graphical representation of correlated data from the plurality of configuration files, wherein the user interface facilitates an editing session with a scope to edit the correlated data in the plurality of configuration files simultaneously based on the graphical representation;
receive a change, at the user interface via the graphical representation, of at least one parameter value represented in at least two of the plurality of configuration files; and
provide an update comprising the changed parameter value to the network data repository for updating the at least two of the plurality of configuration files, wherein the update causes at least two of the plurality of network devices to obtain the changed parameter value.

20. The computer system of claim 19, wherein the editing system is further to:
obtain a logical representation of a configuration file in response to a database query to the network data repository; and
retrieving at least a subset of the plurality of configuration files from the logical representation.

* * * * *